(12) United States Patent
Washizawa

(10) Patent No.: US 8,064,032 B2
(45) Date of Patent: Nov. 22, 2011

(54) ELECTROOPTIC DEVICE, METHOD FOR MANUFACTURING THE SAME, AND ELECTRONIC DEVICE

(75) Inventor: Takehito Washizawa, Matsumoto (JP)

(73) Assignee: Sony Corporation, Tokyo (JP)

( * ) Notice: Subject to any disclaimer, the term of this patent is extended or adjusted under 35 U.S.C. 154(b) by 469 days.

(21) Appl. No.: 11/749,792

(22) Filed: May 17, 2007

(65) Prior Publication Data

US 2008/0043167 A1 Feb. 21, 2008

(30) Foreign Application Priority Data

Jun. 13, 2006 (JP) ................... 2006-163118
Feb. 2, 2007 (JP) ................... 2007-023804

(51) Int. Cl.
*G02F 1/1339* (2006.01)
(52) U.S. Cl. ........................ 349/156; 349/155
(58) Field of Classification Search ........... 349/155–156
See application file for complete search history.

(56) References Cited

U.S. PATENT DOCUMENTS

| 3,961,843 | A | * | 6/1976 | Nakamura et al. | 349/132 |
| 6,368,760 | B1 | | 4/2002 | Nishiguchi | |
| 6,483,498 | B1 | * | 11/2002 | Colgan et al. | 345/173 |
| 6,724,448 | B2 | * | 4/2004 | Nakahara | 349/123 |
| 6,771,327 | B2 | * | 8/2004 | Sekiguchi | 349/12 |
| 2003/0118922 | A1 | * | 6/2003 | Hayashi et al. | 430/7 |
| 2005/0243253 | A1 | | 11/2005 | Imai et al. | |
| 2006/0072045 | A1 | * | 4/2006 | Tanabe et al. | 349/12 |

FOREIGN PATENT DOCUMENTS

| JP | 07-105781 | 4/1995 |
| JP | 09-127309 | 5/1997 |
| JP | 10-153707 | 6/1998 |
| JP | 2002-311233 | 10/2002 |
| JP | 2004-279946 | 10/2004 |
| WO | WO2004/011987 | 2/2004 |

* cited by examiner

*Primary Examiner* — Phu Vu
(74) *Attorney, Agent, or Firm* — K&L Gates LLP

(57) ABSTRACT

An electrooptic device includes: a display panel; an adhesive layer mounted on the outer surface of the display panel; and a functional member bonded to the display panel with the adhesive layer. The adhesive layer has spacers dispersed on the functional member or the display panel.

6 Claims, 10 Drawing Sheets

100

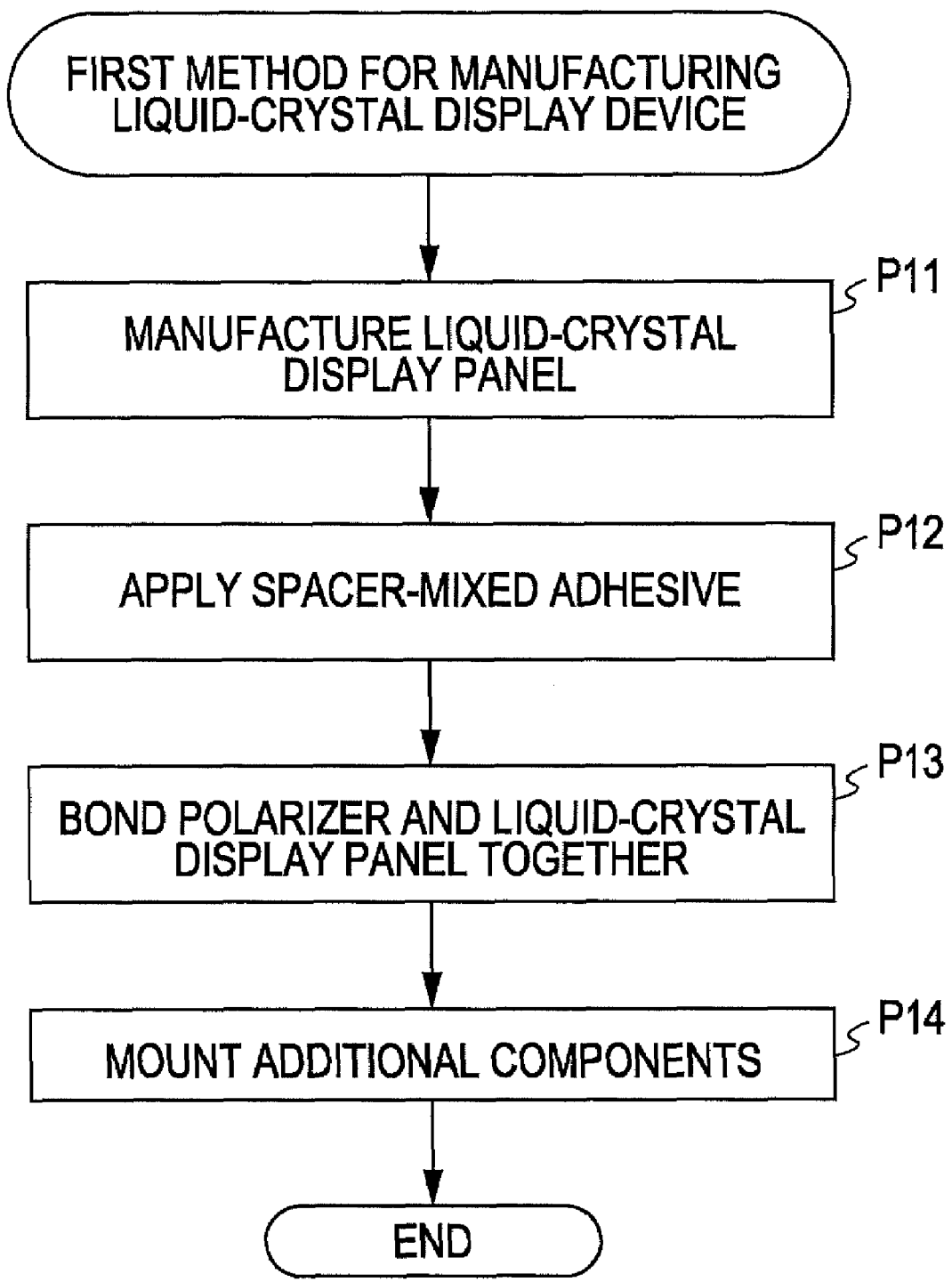

<PROCESS P12>

<PROCESS P13>

⟨ PROCESS P22 ⟩

⟨ PROCESS P23 ⟩

HEAT

< PROCESS P24 >

< PROCESS P25 >

100

ELECTROOPTIC DEVICE, METHOD FOR MANUFACTURING THE SAME, AND ELECTRONIC DEVICE

The entire disclosure of Japanese Patent Application Nos. 2006-163118, filed Jun. 13, 2006 and 2007-023804, filed Feb. 2, 2007 are expressly incorporated by reference herein.

BACKGROUND

1. Technical Field

The present invention relates to an electrooptic device suitable for use in displaying various information.

2. Related Art

Techniques for reducing the size and weight of electrooptic devices have been developing in the last few years. Portable phones and portable digital assistants (PDAs) also use liquid-crystal display devices and are therefore their size and weight reduction has been tried.

Liquid-crystal display devices principally include a liquid-crystal display panel constructed of two opposing substrates made of glass or the like and liquid crystal sandwiched by the two substrates and an illumination system including an optical waveguide having a light source such as a light emitting diode (LED) at the end. The liquid-crystal display panel has, for example, a polarizer bonded to the upper and lower surfaces of the two substrates.

The two substrates of the liquid-crystal display panel have become thin in recent years as liquid-crystal display panels have decreased in thickness. Accordingly, the liquid-crystal display panel is prone to have an uneven gap because of the pressure applied when the polarizer is bonded to the liquid-crystal display panel. For example, the layer of the adhesive (hereinafter, simply referred to as an adhesive layer) sometimes becomes uneven in thickness, depending on the position of pressure when the polarizer is bonded to the liquid-crystal display panel. In this case, Newton's rings are generated around the position of the display screen where the adhesive layer has become thin by strong pressure. Such uneven gap has increasingly become conspicuous as recent liquid-crystal display panels have increased in contrast. JP-A-07-105781 describes a technique for preventing the generation of Newton's rings by bonding a touch panel to a surface supporter that covers the liquid-crystal display panel with acrylic adhesive tape.

The adhesive layer used in the technique described in JP-A-07-105781 may be thicker than 50 μm because tape adhesive is used. However, it is preferable that the adhesive layer be 50 μm in thickness as liquid-crystal display panels have become thin.

SUMMARY

An advantage of some aspects of the invention is to provide an electrooptic device whose adhesive layer is even and thin in thickness.

An electrooptic device according to a first aspect of the invention includes a display panel, an adhesive layer mounted on the outer surface of the display panel, and a functional member bonded to the display panel with the adhesive layer. The adhesive layer has spacers dispersed on the functional member or the display panel.

An example of the electrooptic device is a liquid-crystal display device, which includes a display panel such as a liquid-crystal display panel, an adhesive layer, and a functional member. Examples of the functional member are a polarizer, a parallax barrier, and a touch panel substrate. The adhesive layer is disposed on the outer surface of the display panel. The adhesive layer has spacers dispersed on the functional member or the display panel. This makes the adhesive layer even in thickness, thus preventing an uneven gag.

It is preferable that the spacer be 50 μm or less in size in the direction from the display panel to the functional member. This also allows the thickness of the adhesive layer to be 50 μm or less.

It is preferable that the spacer be shaped like a ball.

It is preferable that the spacer be shaped like a fiber This allows the electrooptic device to be manufactured at lower cost than with the ball spacers.

It is preferable that the adhesive layer and the spacers be transparent. This prevents the adhesive layer and the spacers disposed at the display region of the electrooptic device from reducing the visibility at the display region.

According to a second aspect of the invention, there is provided an electronic device including the above-described electrooptic device.

According to a third aspect of the invention, a method for manufacturing an electrooptic device is provided. The method includes: manufacturing a display panel; applying an adhesive mixed with a plurality of spacers onto the surface of one of the functional member and the display panel; and bonding the functional member to the display panel. This allows the interval between the display panel and the functional member to be held constant, thus preventing the adhesive layer from becoming uneven in thickness by the pressure.

According to a fourth aspect of the invention, a method for manufacturing an electrooptic device is provided. The method includes: manufacturing a display panel; dispersing a plurality of spacers onto the surface of one of the functional member and the display panel; fixing the position of the plurality of spacers dispersed; applying an adhesive onto the surface of one of the functional member and the display panel; and bonding the functional member to the display panel.

BRIEF DESCRIPTION OF THE DRAWINGS

The invention will be described with reference to the accompanying drawings, wherein like numbers reference like elements.

FIG. 4 is a flowchart for a first method for manufacturing the liquid-crystal display device.

DESCRIPTION OF EXEMPLARY EMBODIMENT

A preferred embodiment of the invention will be described with reference to the drawings. The following embodiment is an application of the invention to a liquid-crystal display device.

Liquid-Crystal Display Device

Figure 1:
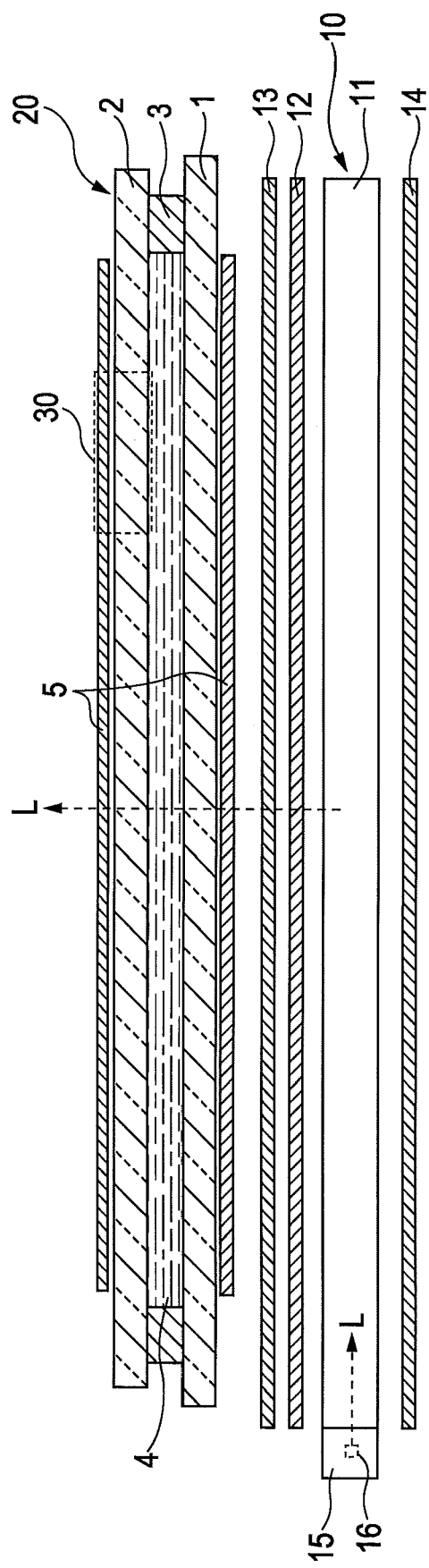
FIG. 1 is a sectional view of a liquid-crystal display device according to an embodiment of the invention.

FIG. 1 is a sectional view of a liquid-crystal display device 100. The liquid-crystal display device 100 principally includes an illumination system 10 having a light source 15 and an optical waveguide 11 and a liquid-crystal display panel 20. The liquid-crystal display panel 20 is opposed to the upper surface of the optical waveguide 11. The optical waveguide 11 has a reflecting sheet 14 on the lower surface thereof. The light source 15 includes a plurality of LEDs 16 or point sources.

Light L emitted from the LEDs 16 enters the optical waveguide 11, and is repeatedly reflected by the upper and lower surfaces of the optical waveguide 11 to change in direction, and exits to the exterior from the upper surface. The exiting light L advances toward the liquid-crystal display panel 20.

The liquid-crystal display panel 20 has substantially the same display area as the luminous area of the optical waveguide 11. The liquid-crystal display panel 20 has a cell structure in which substrates 1 and 2 made of glass or the like are placed one on another with a sealing member 3 sandwiched therebetween, in which liquid crystal 4 is sealed. The liquid-crystal display panel 20 has a polarizer 5 on each outer surface of the substrates 1 and 2.

Between the illumination system 10 and the liquid-crystal display panel 20 are provided optical sheets, for example, a diffusing sheet 12 and a prism sheet 13. The diffusing sheet 12 plays the role of diffusing the light L emitted from the optical waveguide 11 in all directions. The prism sheet 13 plays the role of collecting the light L to the liquid-crystal display panel 20, and has the shape of a substantially triangular-cross-section prism extending to one side (the side perpendicular to the cross section). The light L emitted from the optical waveguide 11 passes through the optical sheets, and then passes through the liquid-crystal display panel 20 to light it up.

Figure 2:
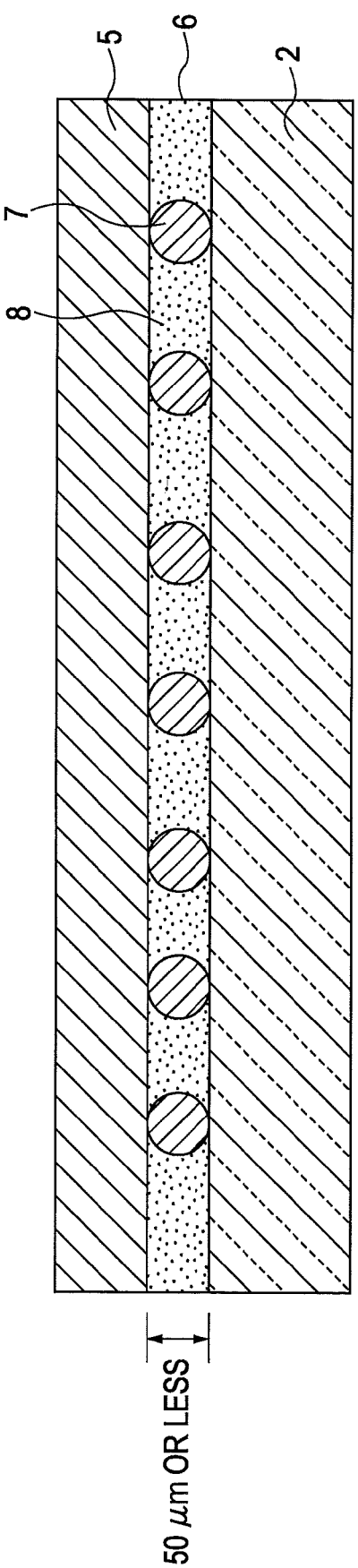
FIG. 2 is an enlarged sectional view of the liquid-crystal display device according to the embodiment.
Figure 3:
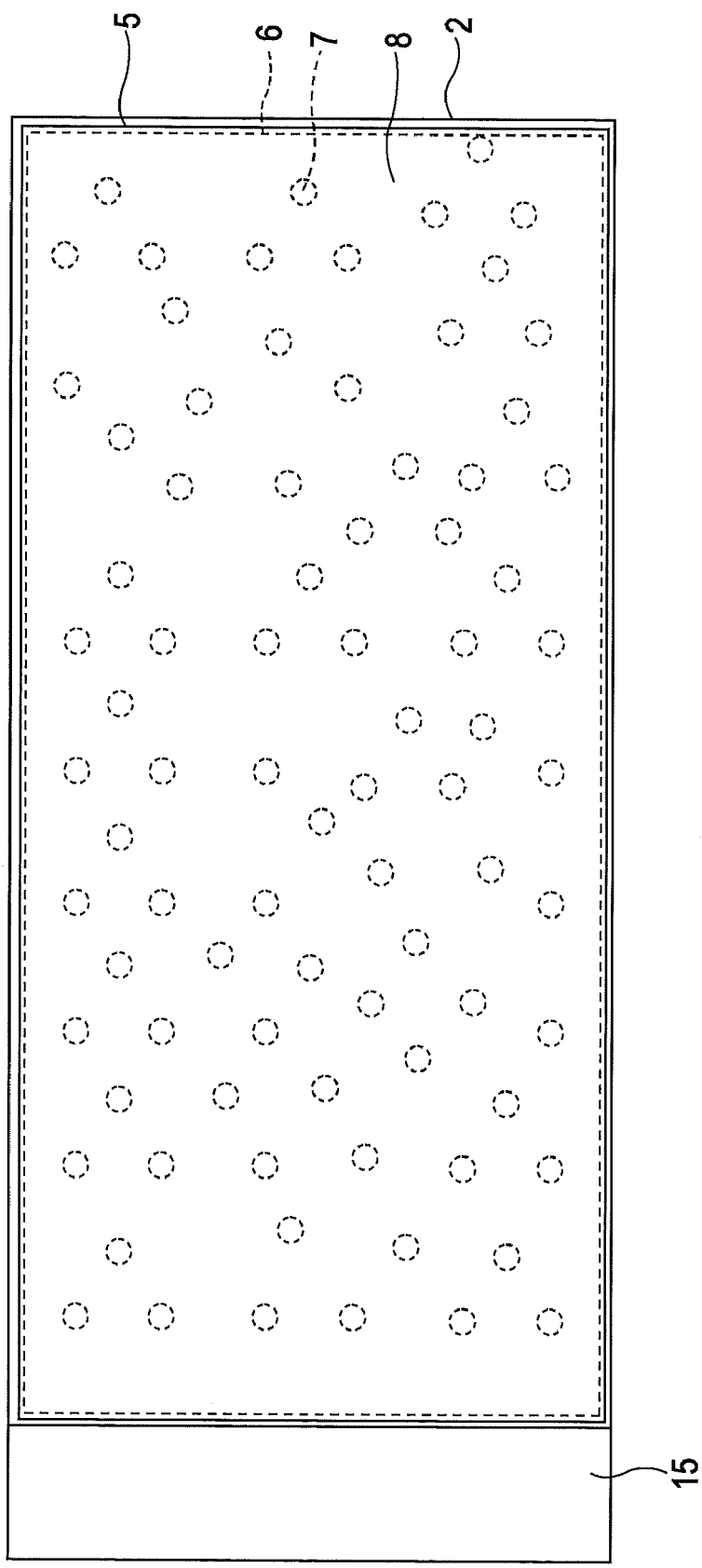
FIG. 3 is a plan view of the liquid-crystal display device of the embodiment.

FIG. 2 is an enlarged sectional view of a region 30 enclosed by the broken line in the liquid-crystal display device 100 shown in FIG. 1. FIG. 3 is a plan view of the liquid-crystal display device 100. As shown in FIG. 2, an adhesive layer 6 is provided between the polarizer 5 and the substrate 2. The polarizer 5 is bonded to the substrate 2 with the adhesive layer 6.

The adhesive layer 6 is constructed of a plurality of spacers 7 and an adhesive 8. The spacers 7 have a spherical shape. Examples of the spacers 7 are resin balls or glass balls. The spacers 7 have the same size, and are dispersed on the surface of the substrate 2 or the polarizer 5 as shown in FIG. 3. The spacers 7 play the role of holding the space between the polarizer 5 and the substrate 2 constant at any position and at all times. The adhesive 8 is applied on the surface of the substrate 2 or the polarizer 5 and fills the space of the adhesive layer 6 other than the portions where the spacers 7 are present.

Thus, the polarizer 5 is bonded to the substrate 2 with the adhesive 8 with a fixed interval held by the spacers 7. This can make the thickness of the adhesive layer 6 even, thus preventing an uneven gap.

In the liquid-crystal display device 100 according to the embodiment, the spacers 7 have a diameter of 50 μm or less. This allows the adhesive layer 6 to be 50 μm in thickness. It is preferable that the adhesive layer of the spacer used in the liquid-crystal display device be transparent. The polarizer 5 is bonded to the region of the substrate 2 including the display area. It is not desirable that the display area have an opaque member which reduces visibility. Therefore, the use of the transparent adhesive layer and spacers can improve the visibility of the display region. It is more preferable that the adhesive layer and the spacers are completely transparent; however, they may be made of a material that does not completely interrupt light. Even the incompletely transparent material can also allow light to pass therethrough because the adhesive layer is thin and the spacers is small in size along the thickness.

Method for Manufacturing Liquid-Crystal Display Device

Figure 5A:
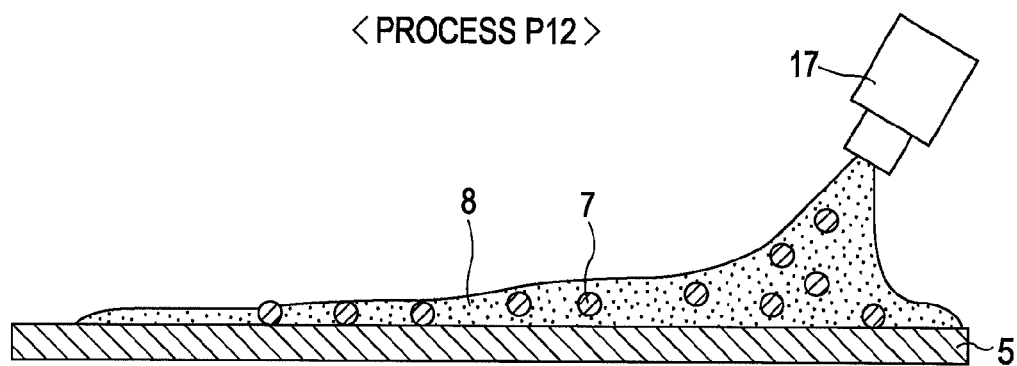
FIG. 5A is a schematic diagram of a process of the first manufacturing method.
Figure 5B:
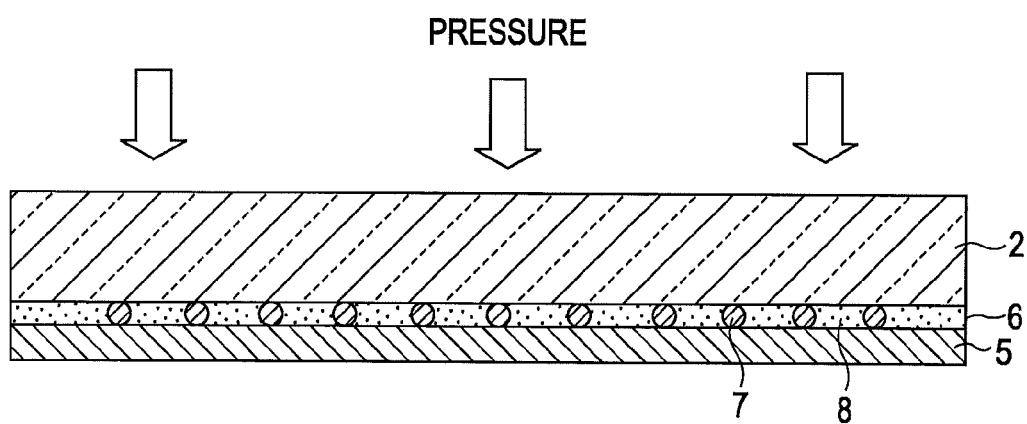
FIG. 5B is a schematic diagram of a process of the first manufacturing method.

A first method for manufacturing the liquid-crystal display device 100 according to this embodiment will be described hereinbelow with reference to the flowchart of FIG. 4. FIG. 4 is a flowchart for the first method for manufacturing the liquid-crystal display device 100 according to the embodiment. FIGS. 5A and 5B are schematic diagrams of the manufacturing processes of the first method for manufacturing the liquid-crystal display device 100 according to the embodiment.

First, in a display-panel manufacturing process, the two substrates 1 and 2 are placed one on top of another, and liquid crystal is sealed between the two substrates 1 and 2 to manufacture the liquid-crystal display panel 20 (process P11).

Next, in a spacer-contained-adhesive applying process, as shown in FIG. 5A, the adhesive 8 containing the spacers 7 is applied onto the surface of the polarizer 5 with a dispenser 17 (process P12). In a functional-component bonding process, as shown in FIG. 5B, the substrate 2 and the polarizer 5 of the liquid-crystal display panel 20 are put one on top of another and bonded together by pressure (process P13). FIG. 5B shows only the substrate 2 of the liquid-crystal display panel 20 for the purpose of illustration. The substrate 1 of the liquid-crystal display panel 20 and the polarizer 5 are also bonded together in the same manner, to which other additional components including the illumination system 10 are attached to complete the liquid-crystal display device 100 (process P14).

In the first method for manufacturing the liquid-crystal display device according to the embodiment, the spacers 7 are disposed between the polarizer 5 and the substrate 2, so that the interval between the polarizer 5 and the substrate 2 can be held constant, thus preventing uneven thickness of the adhesive layer 6 due to pressure.

Figure 6:
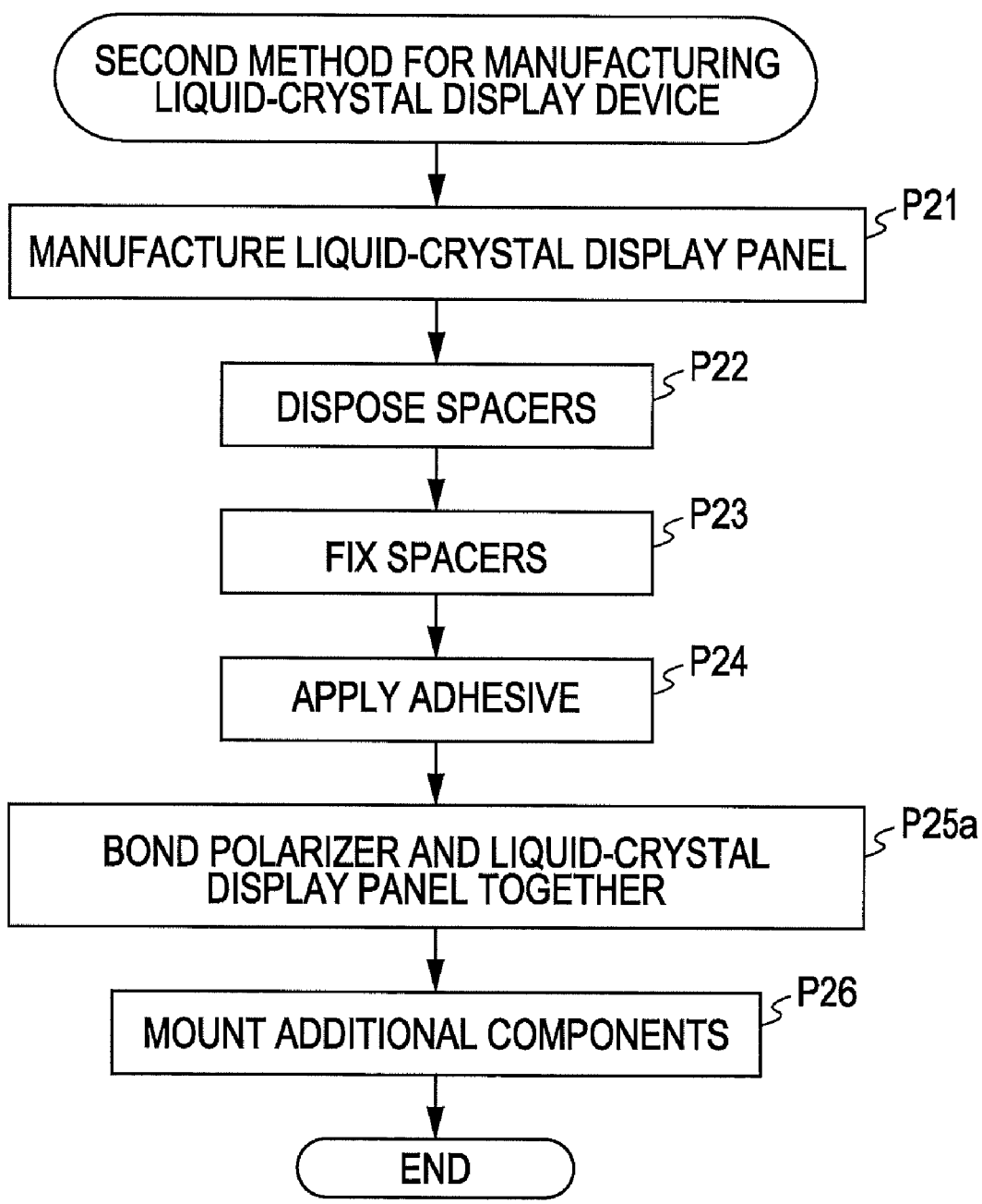
FIG. 6 is a flowchart for a second method for manufacturing the liquid-crystal display device.

A second method for manufacturing the liquid-crystal display device 100 according to the embodiment will be described hereinbelow with reference to the flowchart of FIG. 6. FIG. 6 is a flowchart for the second method for manufacturing the liquid-crystal display device 100 according to the embodiment. FIGS. 7A and 7B and FIGS. 8A and 8B are schematic diagrams of the manufacturing processes of the second method for manufacturing the liquid-crystal display device 100 according to the embodiment.

First, in a display-panel manufacturing process, the two substrates 1 and 2 are placed one on top of another, and liquid crystal is sealed between the two substrates 1 and 2 to manufacture the liquid-crystal display panel 20 (process P21).

Figure 7A:
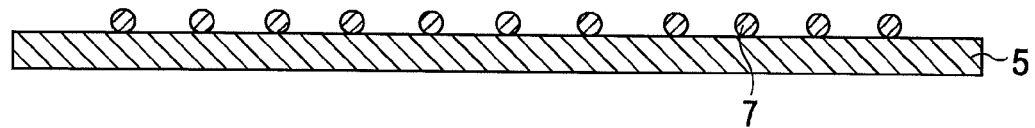
FIG. 7A is a schematic diagram of a process of the second manufacturing method.
Figure 7B:
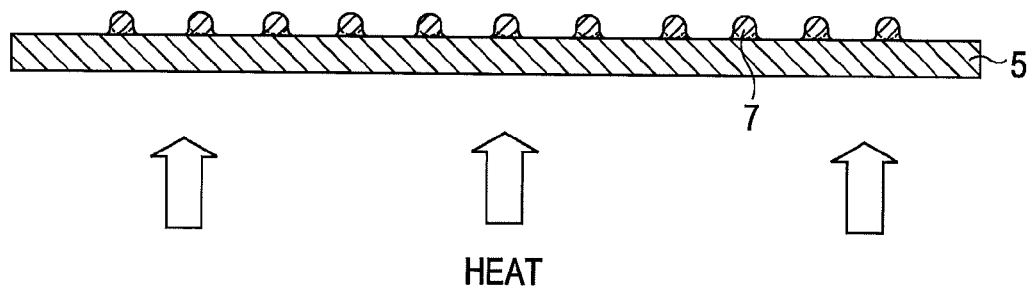
FIG. 7B is a schematic diagram of a process of the second manufacturing method.

Next, in a spacer disposing process, as shown in FIG. 7A, the spacers 7 are dispersed onto the surface of the polarizer 5. For example, thermoplastic resin balls are used for the spacers 7 (process P22). After the spacers 7 have been disposed on the polarizer 5, the polarizer 5 is heated in a spacer-position fixing process, as shown in FIG. 7B, so that the spacers 7 and the polarizer 5 are welded together and thus the spacers 7 are fixed (process P23).

Figure 8A:
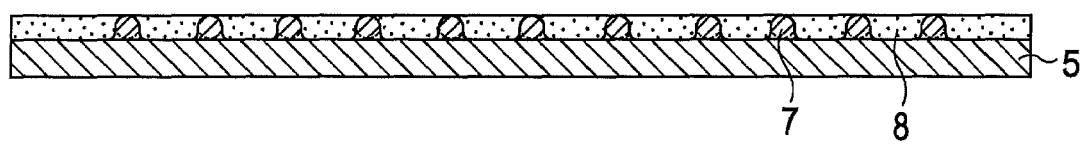
FIG. 8A is a schematic diagram of a process of the second manufacturing method.
Figure 8B:
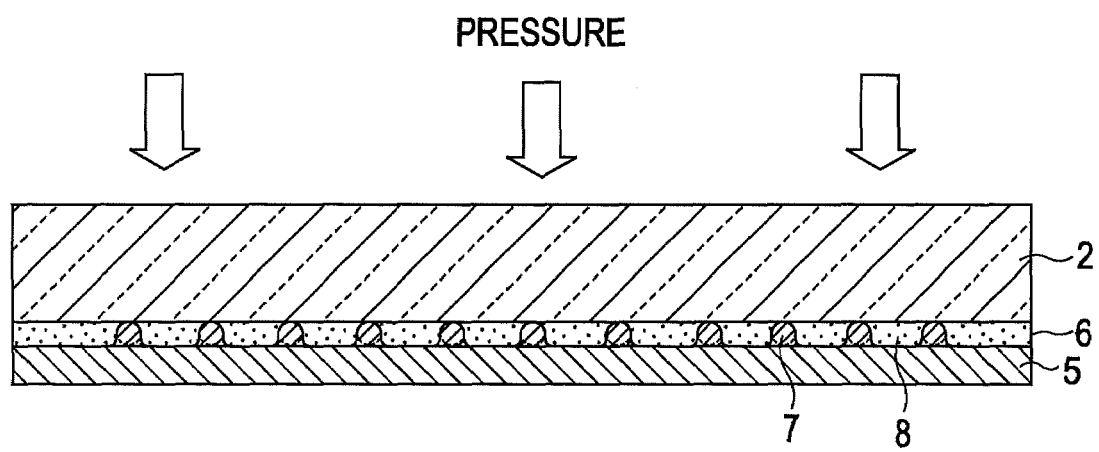
FIG. 8B is a schematic diagram of a process of the second manufacturing method.

Next, as shown in FIG. 8A, in an adhesive applying process, the adhesive 8 is applied onto the polarizer 5 with a dispenser or the like (process P24). Then, as shown in FIG. 8B, in a functional-component bonding process, the substrate 2 of the liquid-crystal display panel 20 and the polarizer 5 are placed one on top of another and bonded together by pressure (process P25). FIG. 8B shows only the substrate 2 of the liquid-crystal display panel 20 for the purpose of description. The substrate 1 of the liquid-crystal display panel 20 and the polarizer 5 are also boned together in the same way, to which other additional components including the illumination system 10 are mounted to complete the liquid-crystal display device 100 (process P26).

In the second manufacturing method, after the spacers 7 have been fixed to the polarizer 5 in advance, the adhesive 8 is applied to the polarizer 5. This prevents the spacers 7, when pressurized, from radiating externally in all directions around the pressurized position of the liquid-crystal display panel 20.

In the second method for manufacturing the liquid-crystal display device according to the embodiment, too, the spacers 7 are disposed between the polarizer 5 and the substrate 2, so that the interval between the polarizer 5 and the substrate 2 can be held constant, thus preventing uneven thickness of the adhesive layer due to pressure.

In the first and second manufacturing methods, the adhesive 8 is applied onto the surface of the polarizer 5; alternatively, the adhesive 8 may be applied onto the surface of the substrate 2 of the liquid-crystal display panel 20. In the first and second manufacturing methods, after the liquid-crystal display panel 20 has been manufactured, the polarizer 5 is boned thereto; the invention is not limited to that. Alternatively, the liquid-crystal display device 100 may be manufactured in such a manner that after the polarizer 5 has been bonded to the substrate 2 and the substrate 1 in advance by the bonding method described in the first and second manufacturing methods, the substrate 1 and the substrate 2 are placed one on top of another, and liquid crystal is sealed between them.

Modification

Figure 9:
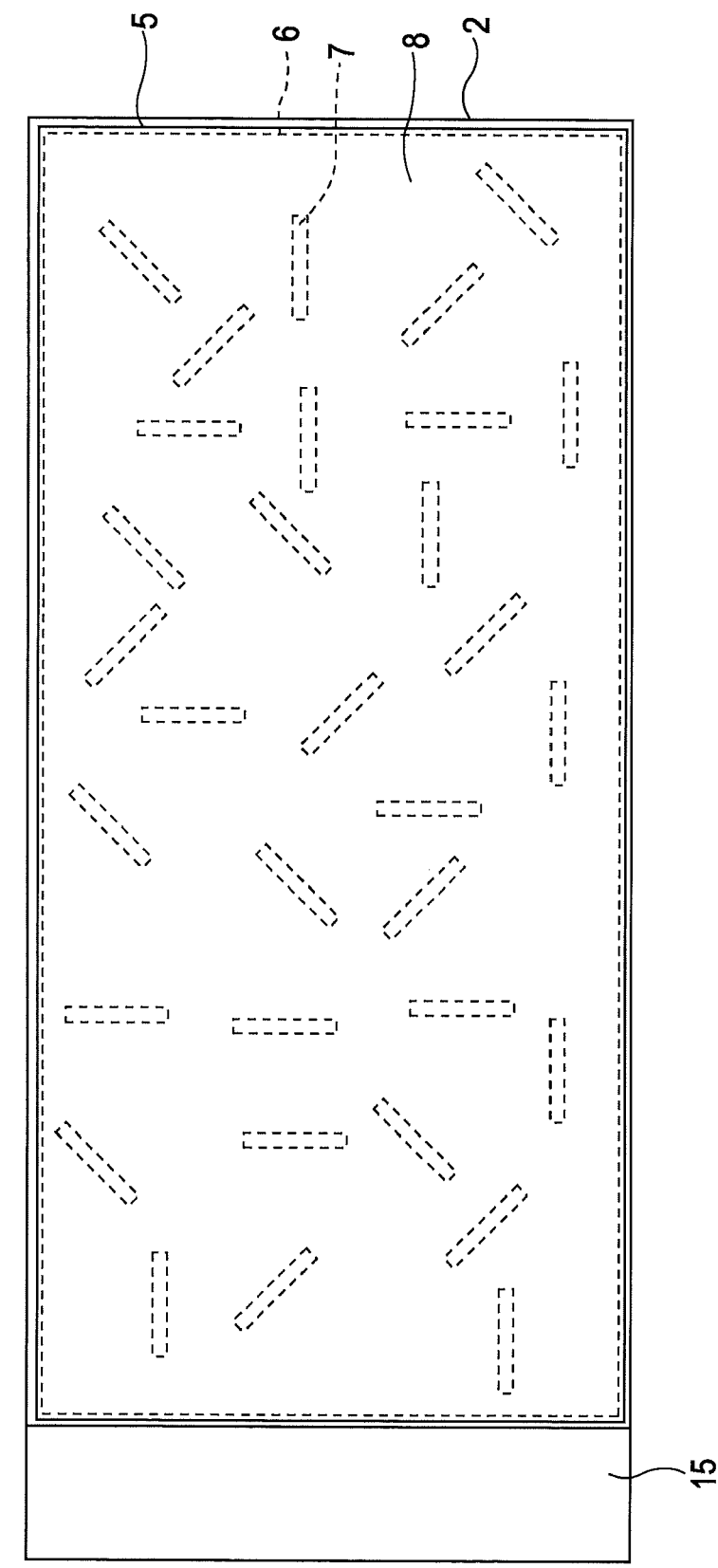
FIG. 9 is a plan view of a liquid-crystal display device according to a modification.

A modification of the liquid-crystal display device 100 according to the embodiment will next be described. FIG. 9 shows the liquid-crystal display device 100 according to a modification in plan view.

In the liquid-crystal display device 100 according to the modification, fibers such as glass fibers are used for the spacers 7, as shown in FIG. 9, replacing the balls, like resin balls in the foregoing embodiment. This also allows the polarizer 5 to be bonded to the substrate 2 with the adhesive 8 while holding a specified interval therebetween with the spacers 7, thus achieving even thickness of the adhesive layer 6 and preventing an uneven gap. Moreover, setting the cross section of the fiber spacers 7 at 50 µm or less allows the thickness of the adhesive layer 6 to be 50 µm or less. Since fiber spacers can be formed more easily than ball spacers, the liquid-crystal display device 100 according to the modification can be manufactured at lower cost than the liquid-crystal display device 100 according to the foregoing embodiment.

The shape of the spacers 7 is not limited to the above-described balls and fibers; instead, they may be in various shapes. Even if any shape of spacers 7 are used, the adhesive layer 6 can be made smaller 50 µm or less when the size of the spacers 7 in the direction from the substrate 2 to the polarizer 5 is 50 µm or less.

While the embodiment has been described for the case in which the liquid-crystal display panel and the polarizer are bonded together, the scope of the application of the invention is not limited to that. It is obvious to those skilled in the art that the invention can be applied to a case where a parallax barrier for three-dimensional display or the touch panel substrate of a touch panel is bonded to a liquid-crystal display panel. Furthermore, it is to be understood that the invention can be applied not only to the case where functional members are bonded to the liquid-crystal display panel but also to a case where the functional members are bonded to another display panel such as a plasma display panel.

Electronic Device

Concrete examples of an electronic device that can incorporate the liquid-crystal display device 100 according to the invention will be described with reference to FIGS. 10A and 10B.

First, an example in which the liquid-crystal display device 100 of the invention is applied to the display of a portable personal computer (a notebook computer) will be described. FIG. 10A is a perspective view of the personal computer denoted at 710. The personal computer 710 includes a main body 712 having a keyboard 711 and a display 713 incorporating the liquid-crystal display panel according to the invention.

Next, an example in which the liquid-crystal display device 100 of the invention is applied to the display of a portable phone will be described. FIG. 10B is a perspective view of the portable phone denoted at 720. The portable phone 720 includes a plurality of operation buttons 721, a receiver 722, a transmitter 723, and a display 724 incorporating the liquid-crystal display device 100 of the invention.

Figure 10A:
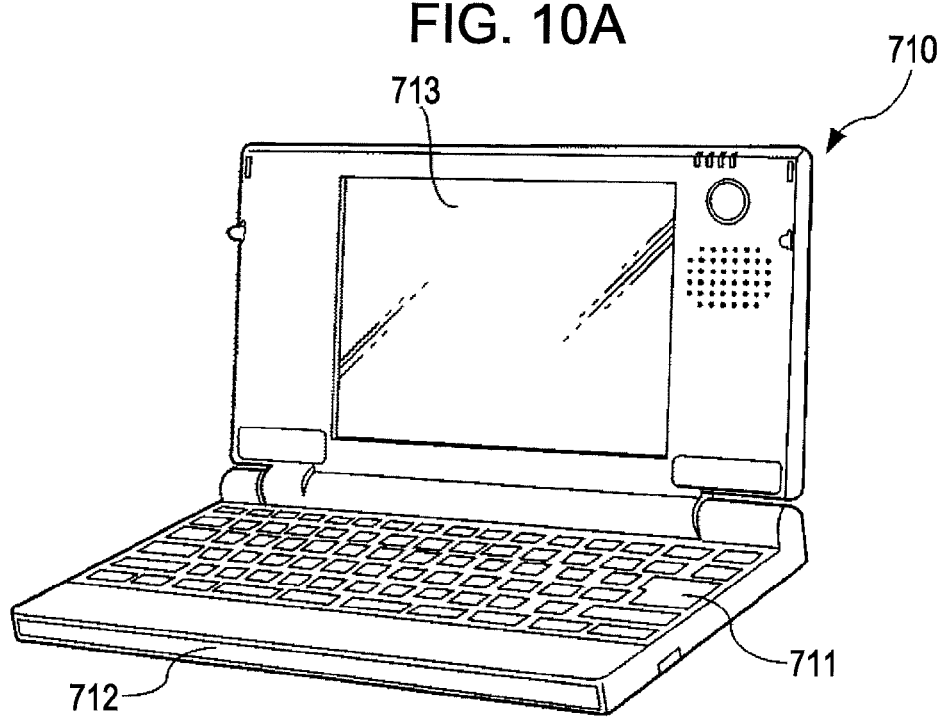
FIG. 10A is a perspective view of an electronic device incorporating the liquid-crystal display device of the invention.
Figure 10B:
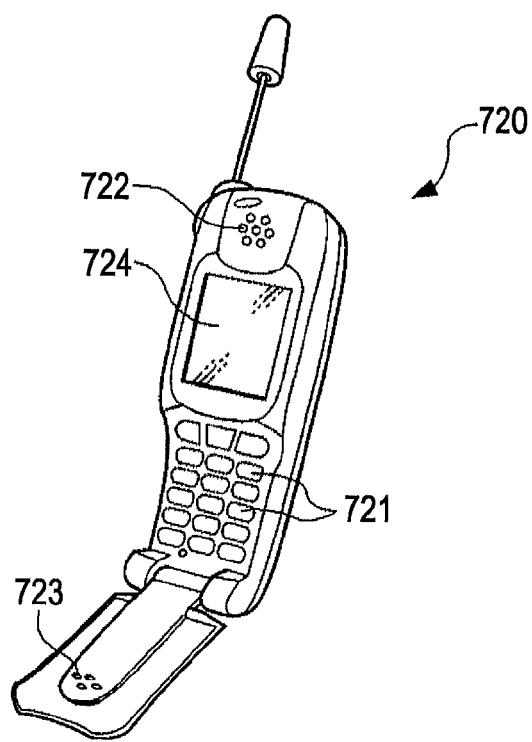
FIG. 10B is a perspective view of an electronic device incorporating the liquid-crystal display device of the invention.

Examples of an electronic device that can incorporate the liquid-crystal display device 100 according to the invention are, in addition to the personal computer shown in FIG. 10A and the portable phone shown in FIG. 10B, liquid-crystal TVs, view-finder or monitor-direct-view video tape recorders, car navigation systems, pagers, electronic notepads, electronic calculators, word processors, work stations, videophones, POS terminals, and digital still cameras.

What is claimed is:

1. An electrooptic device comprising:
    a display panel;
    an adhesive layer mounted on the outer surface of the display panel; and
    a polarizer bonded directly to the display panel with the adhesive layer, wherein
    the adhesive layer has spacers dispersed therein that each directly contact the polarizer and the display panel such that a distance between the polarizer and the display panel is uniform along an entire length of an interface therebetween, wherein the adhesive layer and the spacers are transparent.

2. The electrooptic device according to claim 1, wherein the spacer is 50 µm or less in size in the direction from the display panel to the polarizer.

3. The electrooptic device according to claim 1, wherein the spacer is shaped like a ball.

4. The electrooptic device according to claim 1, wherein the spacer is shaped like a fiber.

5. An electronic device comprising the electrooptic device according to claim 1.

6. A method for manufacturing an electrooptic device, the method comprising:

manufacturing a display panel;

dispersing a plurality of spacers onto a surface of one of a polarizer and the display panel;

fixing the plurality of spacers to said surface onto which the spacers were dispersed;

after fixing the plurality of spacers, applying an adhesive layer onto the surface including the plurality of spacers; and bonding the polarizer directly to the display panel with the adhesive layer and plurality of spacers therebetween, wherein the adhesive layer and the spacers are transparent.

* * * * *